US010040202B2

(12) United States Patent
Alonso Ramila et al.

(10) Patent No.: US 10,040,202 B2
(45) Date of Patent: Aug. 7, 2018

(54) FLEXIBLE GRIPPING DEVICE FOR A PART STACKING SYSTEM, PART STACKING SYSTEM AND POSITIONING METHOD FOR POSITIONING GRIPPING ELEMENTS FOR A PART STACKING SYSTEM

(71) Applicant: FAGOR ARRASATE, S.COOP., Mondragón (ES)

(72) Inventors: Carlos Alonso Ramila, San Sebastián (ES); Daniel Navero Rueda, Mondragón (ES)

(73) Assignee: FAGOR ARRASATE, S. COOP., Mondragón (ES)

( * ) Notice: Subject to any disclaimer, the term of this patent is extended or adjusted under 35 U.S.C. 154(b) by 0 days.

(21) Appl. No.: 15/619,204

(22) Filed: Jun. 9, 2017

(65) Prior Publication Data

US 2017/0368692 A1    Dec. 28, 2017

Related U.S. Application Data

(63) Continuation of application No. PCT/EP2015/079409, filed on Dec. 11, 2015.

(30) Foreign Application Priority Data

Dec. 11, 2014  (EP) ..................... 14382505

(51) Int. Cl.
*B25J 15/06*  (2006.01)
*B66C 1/02*  (2006.01)
*B25J 15/00*  (2006.01)

(52) U.S. Cl.
CPC ....... *B25J 15/0061* (2013.01); *B25J 15/0616* (2013.01); *B66C 1/0212* (2013.01); *B66C 1/0243* (2013.01)

(58) Field of Classification Search
CPC ............... B25J 15/0052; B25J 15/0061; B25J 15/0616; B66C 1/0212; B66C 1/0243
(Continued)

(56) References Cited

U.S. PATENT DOCUMENTS 4,685,714 A    8/1987  Hoke
5,839,769 A *  11/1998  Slocum ................. B65G 47/26
                                                      294/65

(Continued)

FOREIGN PATENT DOCUMENTS

DE    3504586 A1    9/2004
EP    1462223 A1    9/2004
(Continued)

OTHER PUBLICATIONS

Search Report in corresponding European Patent Application No. 14382505.7, completed on Jun. 11, 2015.
(Continued)

*Primary Examiner* — Dean J Kramer
(74) *Attorney, Agent, or Firm* — Edell, Shapiro & Finnan, LLC

(57) ABSTRACT

A gripping device for a part stacking system that according to one embodiment includes a plurality of supporting arms and a plurality of gripping elements attached to the supporting arms, at least some of the gripping elements being movable with respect to the respective supporting arm. Each supporting arm comprises at least one guiderail and each movable gripping element comprises a carriage movable in the corresponding guiderail. The static friction force between each carriage and the respective guiderail is such that the movable gripping elements are kept immobile with respect to the supporting arms by the static friction force during the part stacking process, and the movable gripping (Continued)

elements are positioned with respect to the respective supporting arm overcoming the static friction force.

20 Claims, 7 Drawing Sheets

(58) Field of Classification Search
USPC .......................................................... 294/65
See application file for complete search history.

(56) References Cited

U.S. PATENT DOCUMENTS

| | | | |
|---|---|---|---|
| 6,349,912 B1* | 2/2002 | Schauss | E04L 31/58 248/228.1 |
| 6,796,588 B2* | 9/2004 | Hsieh | B25B 11/007 294/65 |
| 6,863,323 B2* | 3/2005 | Neveu | B25J 15/0052 294/65 |
| 7,029,046 B2* | 4/2006 | Lim | B23Q 5/40 294/188 |
| 7,798,546 B2* | 9/2010 | Kniss | B25J 15/0052 294/65 |
| 7,971,916 B2* | 7/2011 | Lin | B25J 15/0052 269/24 |
| 8,418,341 B1 | 4/2013 | Fisher | |
| 8,684,418 B2* | 4/2014 | Lin | B25J 15/0061 269/21 |
| 2008/0202602 A1* | 8/2008 | Flaim | B25J 15/0052 137/488 |
| 2009/0194922 A1 | 8/2009 | Lin et al. | |

FOREIGN PATENT DOCUMENTS

| | | |
|---|---|---|
| JP | S625148 U | 1/1987 |
| JP | 2007245300 A | 9/2007 |
| WO | 2009038461 A1 | 3/2009 |
| WO | 2013120462 A2 | 8/2013 |

OTHER PUBLICATIONS

International Search Report in corresponding PCT Patent Application No. PCT/EP2015/079409, dated Mar. 23, 2016.

* cited by examiner

FLEXIBLE GRIPPING DEVICE FOR A PART STACKING SYSTEM, PART STACKING SYSTEM AND POSITIONING METHOD FOR POSITIONING GRIPPING ELEMENTS FOR A PART STACKING SYSTEM

CROSS-REFERENCE TO RELATED APPLICATIONS

This application relates to and claims the benefit and priority to International Application No. PCT/EP2015/079409, filed Dec. 11, 2015, which claims the benefit and priority to European Application No. EP14382505.7, filed Dec. 11, 2014.

TECHNICAL FIELD

The present invention relates to a flexible gripping device for a part stacking system, a part stacking system and a positioning method for positioning gripping elements for a part stacking system.

BACKGROUND

The use of robots with gripping devices comprising a plurality of rods and a plurality of suction cups arranged in said rods for stacking parts is known. For stacking parts of different shapes and sizes, the gripping device must be adapted to the shape of the part.

It is known that a gripping device must be provided for each type of part to be manipulated and the arm must be changed according to the part to be manipulated.

In addition, gripping devices comprising a drive for each rod or suction cup such that the rods or suction cups can be moved by means of said drives are known. The drawback of such gripping devices is that the arm is very heavy and therefore cannot work at high speeds.

DE3504586A1 discloses a flexible manipulator arm comprising two rods and a plurality of gripping elements with respective suction cups arranged on said rods. Each gripping element comprises a blocking/unblocking element that retains said gripping element in the desired position and releases the gripping element so that it can move in the corresponding rod when it is to be positioned. For positioning the gripping elements in the rods, the positioning system comprises means for retaining the gripping element to be positioned.

US2009/0194922A1 discloses a flexible gripping device coupled to a robot manipulator comprising a plurality of supporting arms and a plurality of gripping elements attached to said supporting arms, each gripping element comprising a respective suction cup. The gripping elements are movable with respect to the respective supporting arm, each supporting arm comprising at least one guiderail and each movable gripping element comprising a carriage movable in the corresponding guiderail. The flexible gripping device comprises a blocking/unblocking bolt, which has to be loosen in order to position a gripping element in the corresponding guiderail and tighten to retain a gripping element in the corresponding guiderail.

SUMMARY OF THE DISCLOSURE

A first aspect relates to a flexible gripping device for a part stacking system, comprising a plurality of supporting arms and a plurality of gripping elements attached to said supporting arms, at least some of said gripping elements being movable with respect to the respective supporting arm. Each supporting arm comprises at least one guiderail and each movable gripping element comprises a carriage movable in the corresponding guiderail.

The static friction force between each carriage and the respective guiderail is such that the movable gripping elements are kept immobile with respect to the supporting arms by means of said static friction force during the part stacking process, and said movable gripping elements are positioned with respect to the respective supporting element overcoming said static friction force.

A second aspect relates to a part stacking system comprising a robot manipulator and a flexible gripping device coupled to said robot manipulator, the flexible gripping device having the features described above.

A third aspect relates to a positioning method for positioning gripping elements for a stacking system such as the one described above.

The flexible gripping device allows positioning the gripping elements, thus being adapted for parts of different shapes and sizes. Since it does not need means for blocking/unblocking the gripping elements, the positioning method for positioning gripping elements is simpler and quicker.

These and other advantages and features will become evident in view of the drawings and the detailed description.

DETAILED DESCRIPTION

Figure 1:
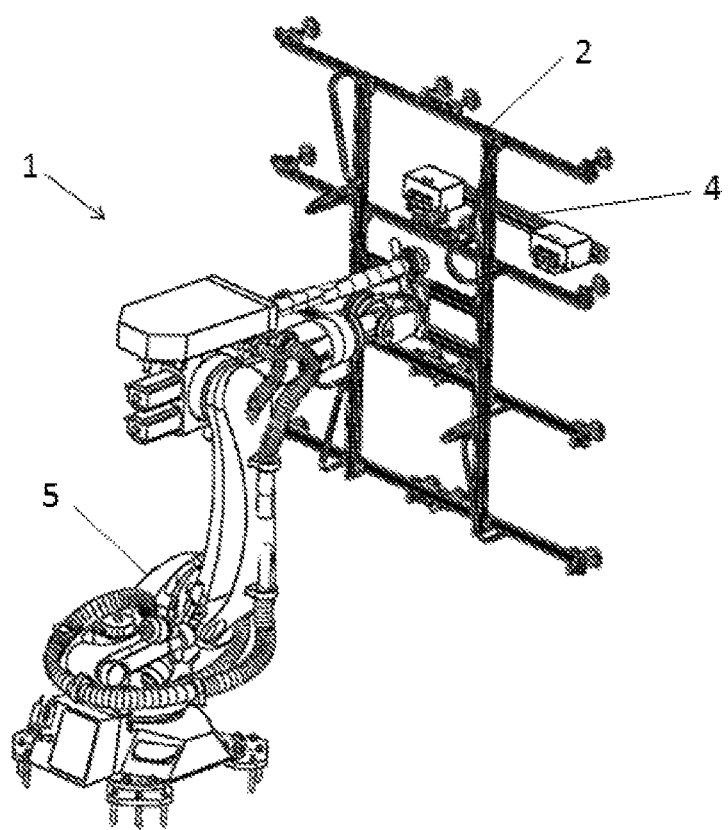
FIG. 1 shows a perspective view of an embodiment of A part stacking system according to one embodiment.

FIG. 1 shows a part stacking system 1 according to one embodiment.

The part stacking system 1 comprises a robot manipulator 5 and a flexible gripping device 2 coupled to said robot manipulator 5.

In this embodiment, the robot 5 is an anthropomorphic robot. In other embodiments, the robot could be a linear arm or any other type of robot known by the person skilled in the art that may be used for moving the flexible gripping device 2.

Figure 2:
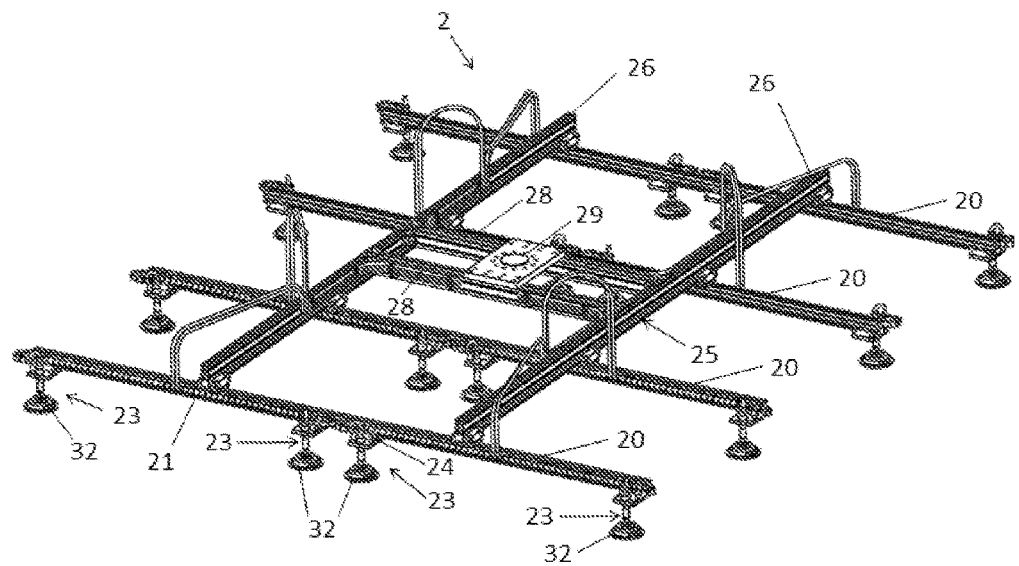
FIG. 2 shows a first perspective view of the flexible gripping device of the part stacking system of FIG. 1.
Figure 3:
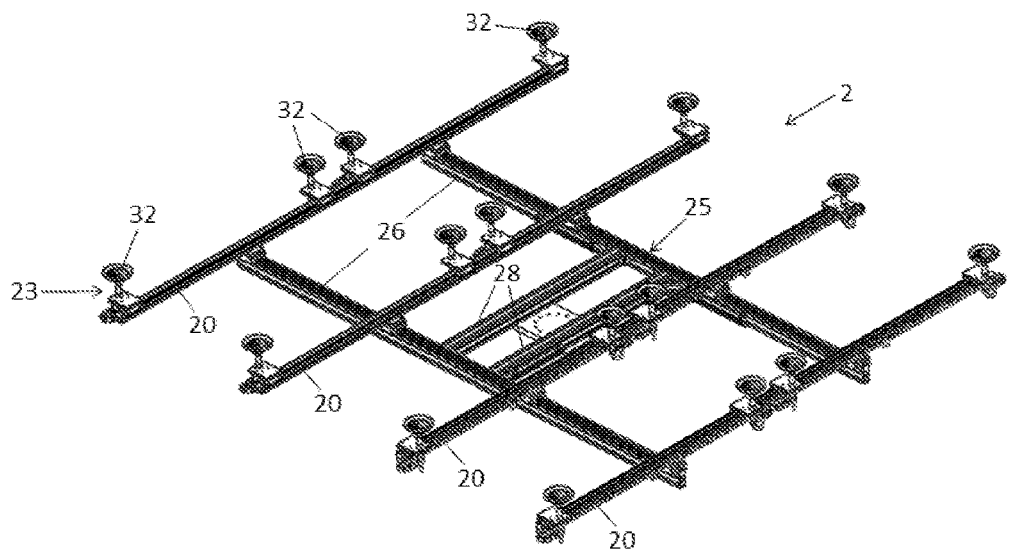
FIG. 3 shows a second perspective view of the flexible gripping device of the part stacking system of FIG. 1.

FIGS. 2 and 3 show in detail the flexible gripping device 2 comprising a plurality of supporting arms 20 and a plurality of gripping elements 23 attached to said supporting arms 20. In this embodiment each gripping element 23 comprises a respective suction cup 32. In this embodiment, all the gripping elements 23 are movable with respect to the supporting arm 20 in which they are arranged. In other possible embodiments each gripping element comprises an electromagnet, a suction element or any other gripping means known by the person skilled in the art. Other possible embodiments could include gripping elements that are fixed to the supporting arm in which they are arranged and gripping elements movable with respect to the supporting arm in which they are arranged.

Each supporting arm 20 comprises a guiderail 21 and each movable gripping element 23 comprises a carriage 24 movable in the corresponding guiderail 21. In this embodiment, each supporting arm 20 and the respective guiderail 21 are two different elements fixed to one another with screws, for example. In other embodiments, each supporting arm and the respective guiderail can be a single element.

The static friction force between each carriage 24 and the respective guiderail 21 is such that the movable gripping elements 23 are kept immobile with respect to the supporting arms 20 during the part stacking process. In other words, based on the characteristics of the types of parts the flexible gripping device 2 is to manipulate, the static friction force between each carriage 24 and the corresponding guiderail 21 is adjusted so that it is equal to or greater than the maximum force that said assembly must withstand during the part stacking process. Specifically, it takes into account the weight and shape of said types of parts to be stacked as well as the working speed in the stacking process.

The static friction force between each carriage 24 and the corresponding guiderail 21 will thus keep the gripping element 23 immobile with respect to the supporting arm 20 during the stacking process. Without modifying said static friction force between each carriage 24 and the corresponding guiderail 21, just overcoming said static friction force, it is possible to position the gripping element 23 with respect to the supporting arm 20.

Thus, said static friction force allows dispensing with a blocking/unblocking element between each carriage 24 and the corresponding guiderail 21, because the static friction force between each carriage 24 and the corresponding guiderail 21 is high enough to maintain the gripping element 23 immobile with respect to the supporting arm 20 during the stacking process, but low enough to allow the positioning of said gripping elements 23. The positioning process for positioning the gripping elements 23 is therefore simpler since the gripping element to be positioned does not need to be blocked/unblocked.

Figure 4:
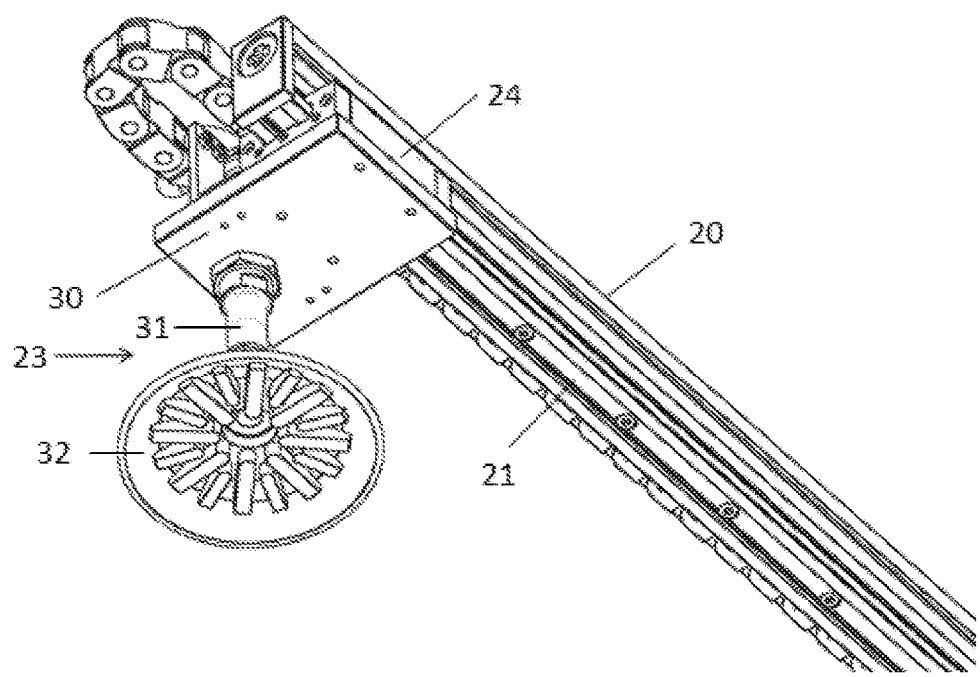
FIG. 4 shows a perspective view of a detail of the flexible gripping device of the part stacking system of FIG. 1.

FIG. 4 shows in detail a gripping element 23 attached to a supporting arm 20 according to this embodiment. Each gripping element 23 comprises a support 30 in which the carriage 24 of the gripping element 23 is fixed. Furthermore, the gripping element 23 comprises a damping shaft 31, a first end of the damping shaft 31 being fixed to the support 30 and a second end of the damping shaft 31 being fixed to the suction cup 32. The damping shaft 31 absorbs the impact of the suction cup 32 when it rests on the part to be stacked and when it releases said part.

In this embodiment, both the carriage 24 and the guiderail 21 are made of metal, particularly aluminum. The carriage 24 comprises a housing that is coupled to the corresponding guiderail 21. A plurality of sliding elements (not shown in the drawings) are arranged inside the housing of the carriage 24, in contact with the housing of the guiderail 21. An adjustment element (not shown in the drawings) is arranged between each sliding element and the respective carriage 24. The static friction force between each carriage 24 and the corresponding guiderail 21 can be manually modified within predetermined limits by adjusting the adjustment elements of the corresponding carriage 24.

In another embodiment not shown in the drawings, the movable attachment between each carriage 24 and the corresponding guiderail 21 can comprise an additional static friction device fixed in the corresponding carriages to provide more static friction force to the carriage-guiderail assembly.

Figure 5:
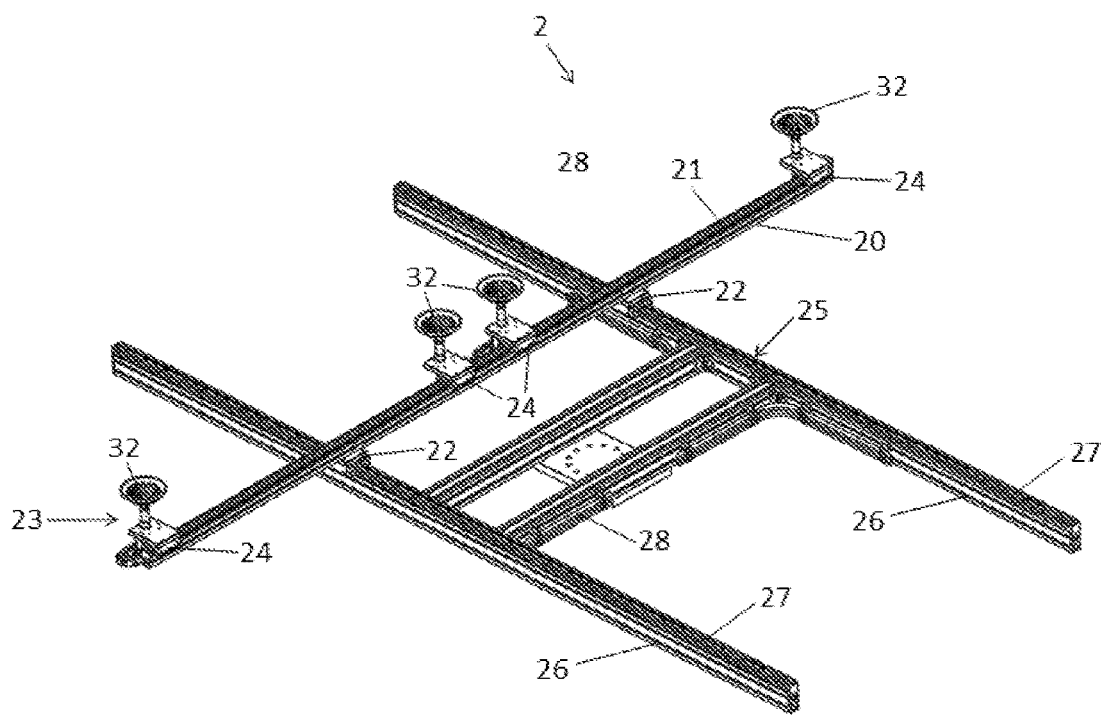
FIG. 5 shows a perspective view of a portion of the flexible gripping device of the part stacking system of FIG. 1.

The flexible gripping device 2 comprises a fixed structure 25 comprising a plurality of fixed arms 26. In this embodiment, the supporting arms 20 are movable with respect to said fixed arms 26. To that end, each fixed arm 26 comprises a guiderail 27 and each movable supporting arm 20 comprises two carriages 22. Each carriage is movable in the guiderail 27 of a corresponding fixed arm 26. FIG. 5 shows in detail a supporting arm 20 attached in a movable manner to the fixed arms 26 by means of two carriages 22. In this embodiment, the supporting arms 20 are parallel to one another and perpendicular to the fixed arms 26.

The static friction force between each carriage 22 and the respective guiderail 27 is such that the supporting arms 20 are kept immobile with respect to the fixed arms 26 during the part stacking process. In other words, based on the characteristics of the types of parts the flexible gripping device 2 is to manipulate, the static friction force between each carriage 22 and the corresponding guiderail 27 is adjusted so that it is equal to or greater than the maximum force that said assembly must withstand during the part stacking process. The static friction force between each carriage 22 and the corresponding guiderail 27 will thus keep the supporting arm 20 immobile during the stacking process. As explained above, without modifying said static friction force between each carriage 22 and the corresponding guiderail 27, just overcoming said static friction force, it is possible to position the supporting arms 20 with respect to the corresponding fixed arms 26. This static friction force allows dispensing with a blocking/unblocking element between each carriage 22 and the corresponding guiderail 27.

In this embodiment, the features of the carriages 22 of the supporting arms 20 and guiderails 27 of the fixed arms 26 are identical to those described for the carriages 24 of the gripping elements 23 and guiderails 21 of the supporting arms 20, so it is considered unnecessary to describe them again.

In this embodiment, the fixed structure 25 comprises two central arms 28 parallel to one another. A support 29 suitable for being fixed to the robot manipulator 5 is arranged in said central arms 28. The fixed structure 25 also comprises two fixed arms 26 parallel to one another. The fixed arms 26 are attached to the central arms 28, the fixed arms 26 and the central arms 28 being perpendicular to one another. The supporting arms 20 are perpendicular to the fixed arms 26.

In this embodiment, the suction cups 23 are vacuum suction cups. Furthermore, they can preferably be activated individually such that they can adapt better to the different shapes of the parts to be stacked.

Figure 6:
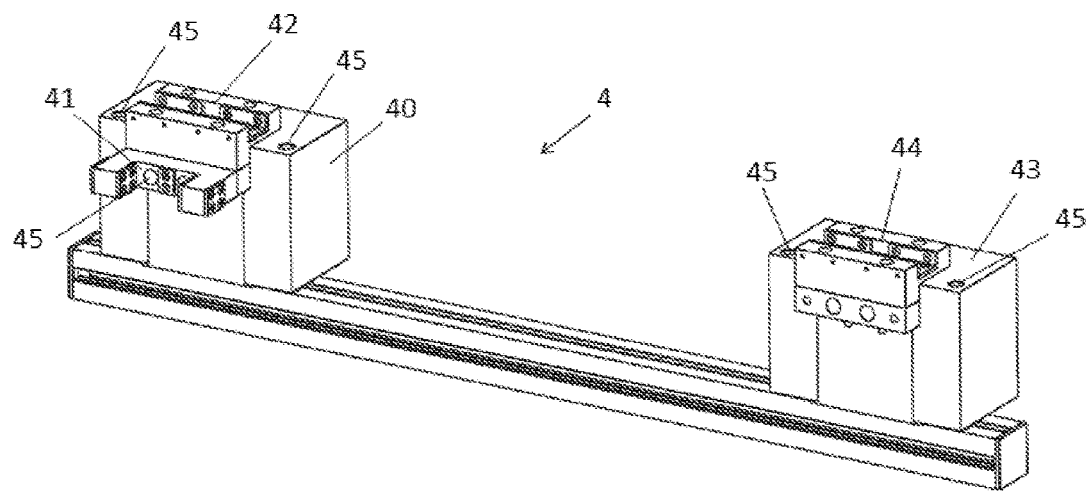
FIG. 6 shows a perspective view of an embodiment of the positioning device of the part stacking system of FIG. 1.

In this embodiment, the part stacking system comprises a device for positioning gripping elements 4 such as that shown in detail in FIG. 6.

Figure 7:
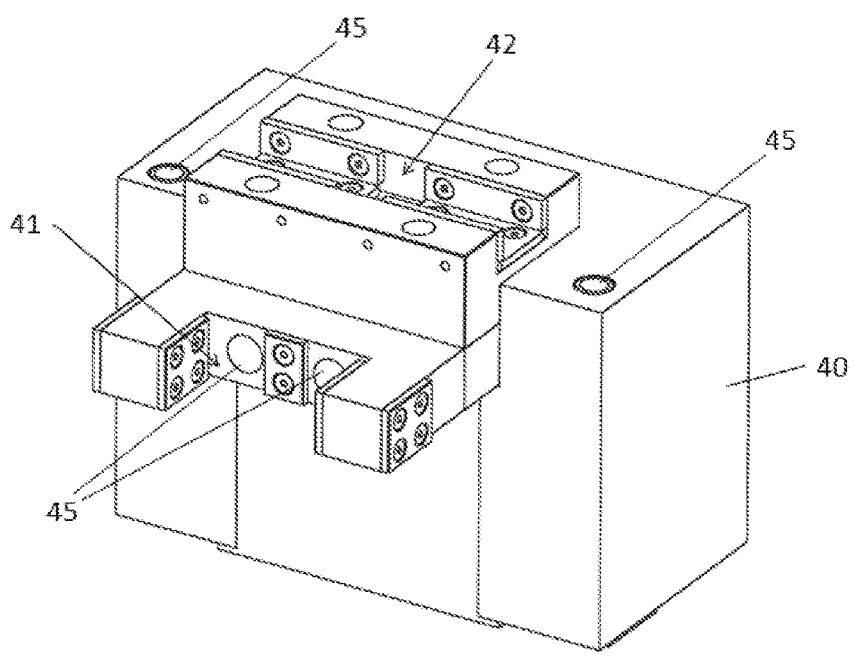
FIG. 7 shows a perspective view of a positioning tool of the positioning device of FIG. 6.
Figure 8:
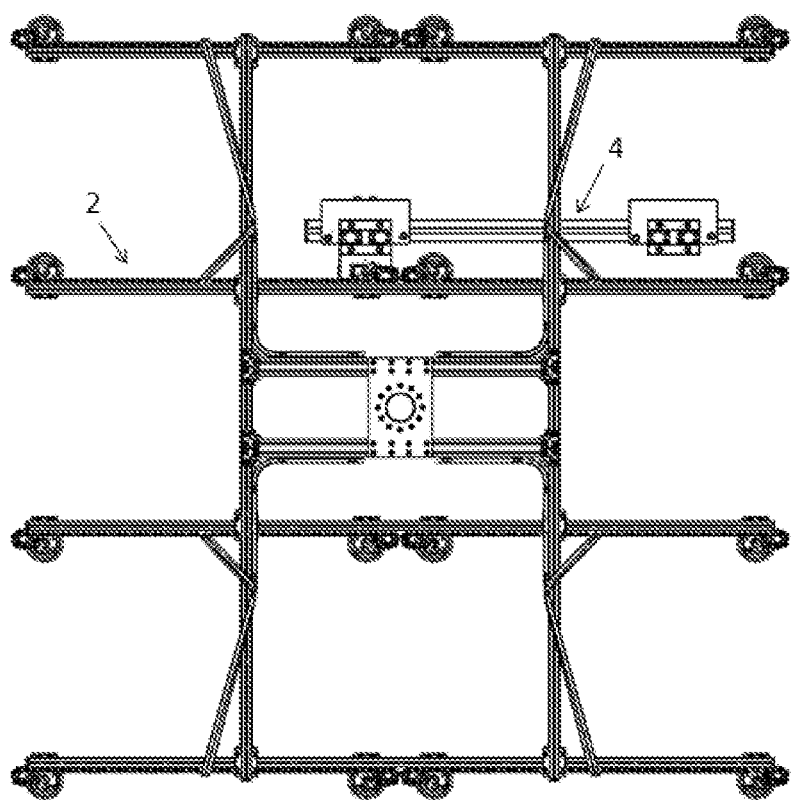
FIG. 8 shows a plan view of a portion of the part stacking system of FIG. 1.
Figure 9:
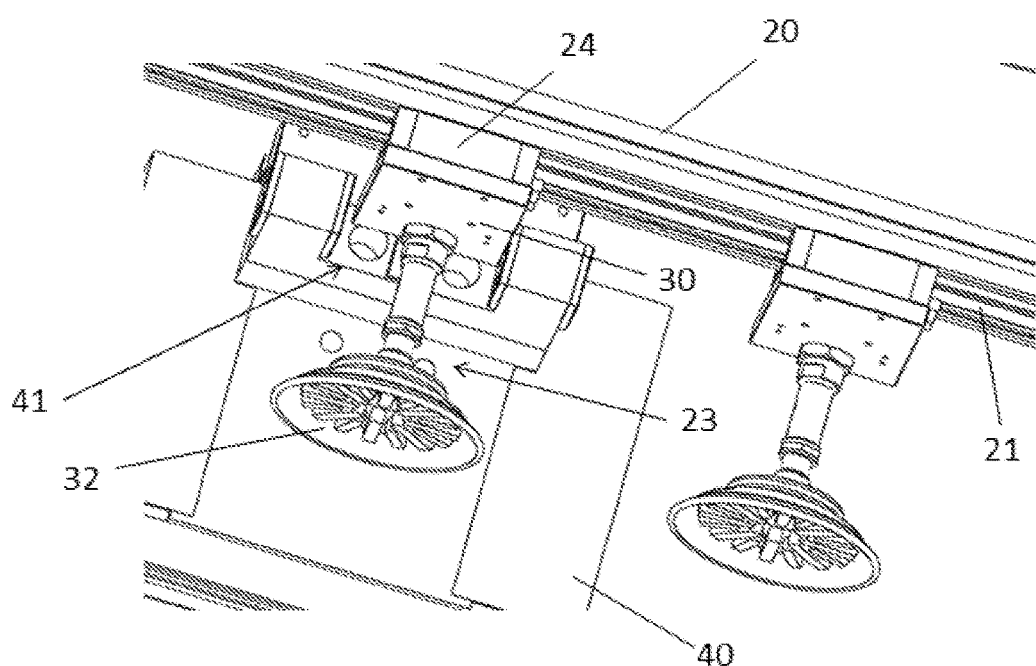
FIG. 9 shows a perspective view of a detail of the part stacking system of FIG. 1, with a gripping element retained in the positioning device.
Figure 10:
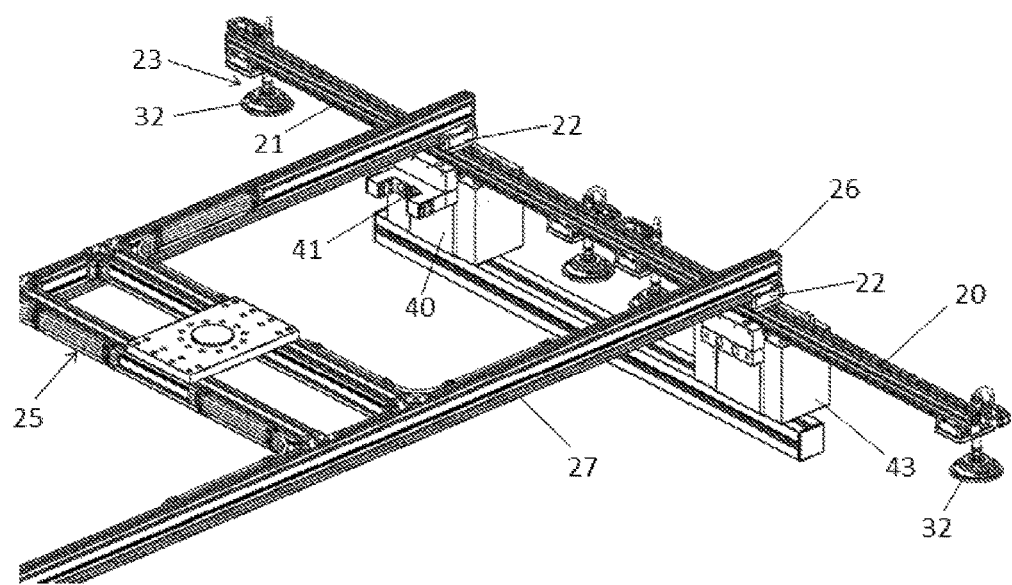
FIG. 10 shows a perspective view of a portion of the part stacking system of FIG. 1, with a supporting arm retained in the positioning device.

The device for positioning gripping elements 4 comprises a positioning tool 40, shown in detail in FIG. 7, comprising a housing 41 adapted for retaining a movable gripping element 23, allowing movement of the flexible gripping device 2 with respect to the retained movable gripping element 23 for moving said gripping element 23 to a new position in the respective supporting arm 20. FIG. 9 shows a gripping element housed in the housing 41. Specifically, it is a portion of the support 30 of the gripping element 23 that is housed in the housing 41. The housing 41 has a shape complementary to the outer shape of the support 30 of the gripping element 23 but with an allowance so that there is a small room for manoeuvre when housing the support 30 of the gripping element 23 in the housing 41, reducing the possibility of both elements hitting one another.

In this embodiment, the positioning tool 40 comprises a second housing 42 adapted for retaining a movable supporting arm 20, allowing movement of the flexible gripping device 2 with respect to the retained movable supporting arm 20 for moving said supporting arm 20 to a new position in the fixed structure 25.

Furthermore, in this embodiment the device for positioning gripping elements 4 comprises a second positioning tool 43 comprising a housing 44 adapted for retaining a movable supporting arm 20, allowing movement of the flexible gripping device 2 with respect to the retained movable supporting arm 20 for moving said supporting arm 20 to a new position in the fixed structure 25.

In this embodiment, the first positioning tool 40 and the second positioning tool 43 are arranged such that a supporting arm 20 can be housed in the second housing 42 of the first positioning tool 40 and in the housing 44 of the second positioning tool 43 at the same time.

In this embodiment, the device for positioning gripping elements 4 comprises a pair of sensors 45 for each housing 41, 42 and 44 of the positioning tools 40, 43 for detecting the position of the gripping element 23 or the supporting arm 20 of the flexible gripping device 2 to be retained. The sensors 45 used are preferably laser sensors. By means of said sensors 45, it can be verified that the gripping element 23 or the supporting arm 20 to be retained are arranged in a suitable position with respect to the respective housing 41, 42 and 44 before housing them in said housings 41, 42 and 44. In other embodiments, the device for positioning gripping elements 4 can comprise a sensor or a plurality of sensors for each housing of the positioning tools.

The positioning method for positioning gripping elements 23 for a stacking system 1 according to this embodiment is described below.

Said method comprises a retaining step for retaining a movable gripping element 23, in which the flexible gripping device houses a gripping element 23 in the housing 41 of the positioning tool.

The method also comprises a positioning step, in which the flexible gripping device 2 moves overcoming the static friction force between the carriage 24 of the retained gripping element 23 and the guiderail 21 of the supporting arm 20 in which it is arranged, relative motion between both elements being produced until the gripping element 23 moves to the desired position. As explained above, an unblocking step for unblocking the retained gripping element 23 is not necessary since there is no blocking element. The gripping element 23 is retained in the corresponding supporting arm 20 by the static friction force existing between the carriage 24 of the gripping element 23 and the corresponding guiderail 21. Therefore, when a gripping element 23 is to be positioned with respect to the supporting arm 20 in which it is arranged, the only thing to be done is to overcome said static friction force existing between the carriage 24 of the gripping element 23 and the corresponding guiderail 21. As explained above, it is not necessary to modify the static friction force between the carriage 24 of the gripping element 23 and the corresponding guiderail 21. When adjusting said static friction force, it is set a static friction force which is high enough to maintain the gripping element 23 immobile in the corresponding supporting arm 20 but low enough to allow its positioning. The positioning method for positioning the gripping elements is therefore simpler and can be carried out in less time, since a blocking step and another unblocking step can be dispensed with.

The method comprises a releasing step for releasing the retained movable gripping element 23, in which the gripping element is removed from the housing 41 of the positioning tool.

This embodiment of the stacking system 1 allows moving two gripping elements 23 at the same time, such that the gripping elements can be positioned in less time. To that end, the positioning step of the positioning method for positioning gripping elements 23 described above comprises a sub-step in which the flexible gripping device 2 moves until the positioning tool 40 in turn retains a second gripping element 23, specifically until the outer portion of the housing 41 reaches the support 30 of a second gripping element 23. In another sub-step, the flexible gripping device 2 moves with respect to the retained gripping element 23 and to the second gripping element 23. In the next sub-step, the flexible gripping device 2 stops when the second gripping element 23 reaches a desired position, and in the last sub-step the retained gripping element 23 is positioned.

In addition, this embodiment of the stacking system 1 allows positioning the supporting arms 20 of the flexible gripping device 2 with respect to the fixed arms 26 of said flexible gripping device 2, thus positioning the gripping elements 23 attached to said supporting arm. For this embodiment in which the supporting arms 20 can be positioned, the method may comprise a retaining step for retaining a movable supporting arm 20, in which the supporting arm 20 is housed in the second housing 42 of the positioning tool 40 and in the housing 44 of the second positioning tool. A positioning step in which the flexible gripping device 2 moves overcoming the static friction force between the carriages 22 of the retained supporting arm 20 and the guiderail 27 of the fixed arms 26 in which they are arranged, relative motion between both elements being produced until the supporting arm 20 moves to the desired position, and a releasing step for releasing the movable supporting arm 20, in which the supporting arm is removed from the housings 42 and 44. As explained above, it is not necessary to modify the static friction force between the carriage 22 and the corresponding guiderail 27. When adjusting said static friction force, it is set a static friction force which is high enough to maintain the supporting arm immobile in the corresponding fixed arm 20 but low enough to allow its positioning.

What is claimed is:

1. A system comprising:
    a gripping apparatus that in a first configuration is configured to hold and transport a first item, the gripping apparatus being capable of assuming a second configuration to hold and transport a second item different from the first item, the gripping apparatus including:
        a first guide rail having a length:
        a gripping element that is configured to hold the first item during the transport of the first item;
        a first carriage onto which the gripping element is attached, the first carriage coupled to the first guide rail at a first location along the length of the first guide rail so that a first static friction force exists between the first carriage and the first guide rail to hold the first carriage at the first location, the first static friction force being sufficient by itself to hold the first carriage at the first location when the first item is transported, without modifying the first static friction force between the first carriage and the first guide rail, the first carriage being movable along the length of the first guide rail to enable the gripping apparatus to assume the second configuration.

2. The system according to claim 1, wherein the first guide rail is moveable within the gripping apparatus.

3. The system according to claim 2, further comprising a second guide rail and a second carriage, the second guide rail having a length, the first guide rail being coupled to the second guide rail by the second carriage, the second carriage being coupled to the second guide rail at a first location along the length of the second guide rail so that a second static friction force exists between the second carriage and the second guide rail to hold the second carriage at the first location, the second static friction force being sufficient by itself to hold the second carriage at the first location when the first item is transported, without modifying the second static friction force between the second carriage and the second guide rail, the second carriage being movable along the length of the second guide rail from the first location to a second location.

4. The system according to claim 3, wherein the second guide rail is not movable within the gripping apparatus.

5. The system according to claim 4, further comprising a first positioning tool that includes a first housing that is configured to receive and hold the first guide rail stationary when the gripping apparatus transitions from the first configuration to the second configuration, and a second positioning tool that includes a second housing that is configured to receive and hold the first guide rail stationary when the gripping apparatus transitions from the first configuration to the second configuration.

6. The system according to claim 5, wherein the first positioning tool is attached to the second positioning tool.

7. The system according to claim 3, further comprising a positioning tool that includes a housing that is configured to receive and hold the first guide rail stationary when the gripping apparatus transitions from the first configuration to the second configuration.

8. The system according to claim 7, wherein the positioning tool comprises at least one sensor for detecting the position of the first guide rail.

9. The system according to claim 3, further comprising a positioning tool that includes a first housing and a second housing, the first housing being configured to receive and hold the gripping element stationary when the gripping apparatus transitions from the first configuration to the second configuration, the second housing being configured to receive and hold the first guide rail stationary when the gripping apparatus transitions from the first configuration to the second configuration.

10. The system according to claim 9, wherein the positioning tool includes a body having a first side and a second side different from the first side, the first housing being located on the first side, the second housing being located on the second side.

11. The system according to claim 10, wherein the first and second sides are arranged orthogonal to one another.

12. The system according to claim 1, wherein gripping element includes a suction cup.

13. The system according to claim 12, wherein the suction cup is a vacuum suction cup.

14. The system according to claim 1, wherein the gripping apparatus is attached to a robot manipulator.

15. The system according to claim 1, further comprising a positioning tool that includes a housing that is configured to receive and hold the gripping element stationary when the gripping apparatus transitions from the first configuration to the second configuration.

16. The system according to claim 8, wherein the positioning tool comprises at least one sensor for detecting the position of the gripping element.

17. A system comprising:
a gripping apparatus that in a first configuration is configured to hold and transport a first item, the gripping apparatus being capable of assuming a second configuration to hold and transport a second item different from the first item, the gripping apparatus including:
a support arm having a length:
a gripping element coupled to the support arm that is configured to hold the first item during the transport of the first item;
a first guide rail;
a first carriage onto which the support arm is attached, the first carriage coupled to the first guide rail at a first location along the length of the first guide rail so that a first static friction force exists between the first carriage and the first guide rail to hold the first carriage at the first location, the first static friction force being sufficient by itself to hold the first carriage at the first location when the first item is transported, without modifying the first static friction force between the first carriage and the first guide rail, the first carriage being movable along the length of the first guide rail to enable the gripping apparatus to assume the second configuration.

18. A method for altering the configuration of a gripping apparatus from a first configuration to a second configuration, wherein in the first configuration the gripping apparatus is configured to hold and transport a first item and in the second configuration the gripping apparatus is configured to hold and transport a second item different than the first item, the gripping apparatus including:
a guide rail having a length:
a first gripping element that is configured to hold the first item during the transport of the first item;
a first carriage onto which the first gripping element is attached, the first carriage coupled to the guide rail at a first location along the length of the guide rail so that a first static friction force exists between the first carriage and the guide rail to hold the first carriage at the first location, the first static friction force being sufficient to hold the first carriage at the first location when the first item is transported;
the method comprising:
holding the first gripping element stationary; and
while holding the first gripping element stationary moving the gripping apparatus so that the first carriage moves from the first location to a second location along the length of the guide rail, the first carriage being moved along the length of the guide rail from the first location to the second location while the first static friction force is maintained between the first carriage and the guide rail.

19. The method according to claim 18, wherein the gripping apparatus further includes a second carriage onto which is attached a second gripping element, the second carriage coupled to the guide rail at a third location along the length of the guide rail so that a second static friction force exists between the second carriage and the guide rail to hold the second carriage at the third location, the second static friction force being sufficient to hold the second carriage at the third location when the first item is transported;

the method comprising:

holding the second gripping element stationary while moving the gripping apparatus so that the second carriage moves from the third location to a fourth location along the length of the guide rail, the second carriage being moved along the length of the guide rail from the third location to the fourth location while the second static friction force is maintained between the second carriage and the guide rail, the second carriage being moved along the length of the guide rail from the third location to the fourth location simultaneous with the first carriage being moved along the length of the guide rail from the first location to the second location.

20. A method for altering the configuration of a gripping apparatus from a first configuration to a second configuration, wherein in the first configuration the gripping apparatus is configured to hold and transport a first item and in the second configuration the gripping apparatus is configured to hold and transport a second item, the gripping apparatus including:

a support arm having a length:

a gripping element attached to the support arm, the gripping element being configured to hold the first item during the transport of the first item;

a fixed guide rail;

a carriage onto which the support arm is attached, the carriage coupled to the fixed guide rail at a first location along the length of the fixed guide rail so that a static friction force exists between the carriage and the fixed guide rail to hold the carriage at the first location, the first static friction force being sufficient to hold the carriage at the first location when the first item is transported;

the method comprising:

holding the support arm stationary; and while holding the support arm stationary moving the gripping apparatus so that the carriage moves from the first location to a second location along the length of the fixed guide rail, the carriage being moved along the length of the fixed guide rail from the first location to the second location while the first static friction force is maintained between the carriage and the fixed guide rail.

* * * * *